US012579560B2

(12) United States Patent
Adam

(10) Patent No.: US 12,579,560 B2
(45) Date of Patent: Mar. 17, 2026

(54) SYSTEM AND METHOD FOR MANAGING THE CONTENT IN A STORAGE ASSEMBLY

(71) Applicant: Rani Adam, Edensor Park (AU)

(72) Inventor: Rani Adam, Edensor Park (AU)

( * ) Notice: Subject to any disclaimer, the term of this patent is extended or adjusted under 35 U.S.C. 154(b) by 562 days.

(21) Appl. No.: 18/072,741

(22) Filed: Dec. 1, 2022

(65) Prior Publication Data

US 2024/0185314 A1     Jun. 6, 2024

(51) Int. Cl.
*G06Q 30/00* (2023.01)
*G06Q 30/0601* (2023.01)

(52) U.S. Cl.
CPC ................................. *G06Q 30/0601* (2013.01)

(58) Field of Classification Search
CPC ...................................................... G06Q 30/06
USPC ...................................................... 705/26, 27
See application file for complete search history.

(56) References Cited

U.S. PATENT DOCUMENTS

| | | | | |
|---|---|---|---|---|
| 9,449,208 B2 * | 9/2016 | Luk | .................... | G06K 7/10415 |
| 2011/0122120 A1 * | 5/2011 | Feuilloley | ........ | G06K 19/07758 |
| | | | | 345/107 |
| 2016/0055451 A1 * | 2/2016 | Waters | .................... | H04W 4/02 |
| | | | | 340/8.1 |
| 2016/0162715 A1 * | 6/2016 | Luk | ........................ | F25D 29/00 |
| | | | | 235/385 |

| | | | | |
|---|---|---|---|---|
| 2019/0164117 A1 * | 5/2019 | Wallace | .............. | H04L 12/2829 |
| 2021/0089853 A1 * | 3/2021 | Blake | ................ | G06K 19/07758 |
| 2022/0067642 A1 * | 3/2022 | Barton | ............... | G06Q 30/0617 |
| 2022/0222614 A1 * | 7/2022 | Reynolds | .................. | G09F 3/02 |

FOREIGN PATENT DOCUMENTS

| | | | | |
|---|---|---|---|---|
| WO | WO-2012003580 A1 * | 1/2012 | ............. | G06Q 30/02 |

OTHER PUBLICATIONS

Panasonic, Detroit Replaces Paper KANBAN System with Logiscend for Parts Replacement, logiscend.panasonic.com; 2pgs. ( Year: 2020).*

* cited by examiner

*Primary Examiner* — Robert M Pond
(74) *Attorney, Agent, or Firm* — Rani Adam

(57) ABSTRACT

The present invention discloses a system and method for managing content in a storage assembly such as a container. The system comprises the container having a smart module, a user device associated with a user and a container management server comprising at least one computing device and a database. The container is adapted for storing at least one content and the smart module comprises at least one sensor configured to measure a volume of content in the container. The computing device is configured to enable the user to assign an identification name to the container and enter information related to the contents of the container. The computing device is further configured to provide information related to volume of the content in the container. The computing device is further configured to communicate with one or more vendors, and automatically order the content in the container when the content reaches a predetermined level.

14 Claims, 10 Drawing Sheets

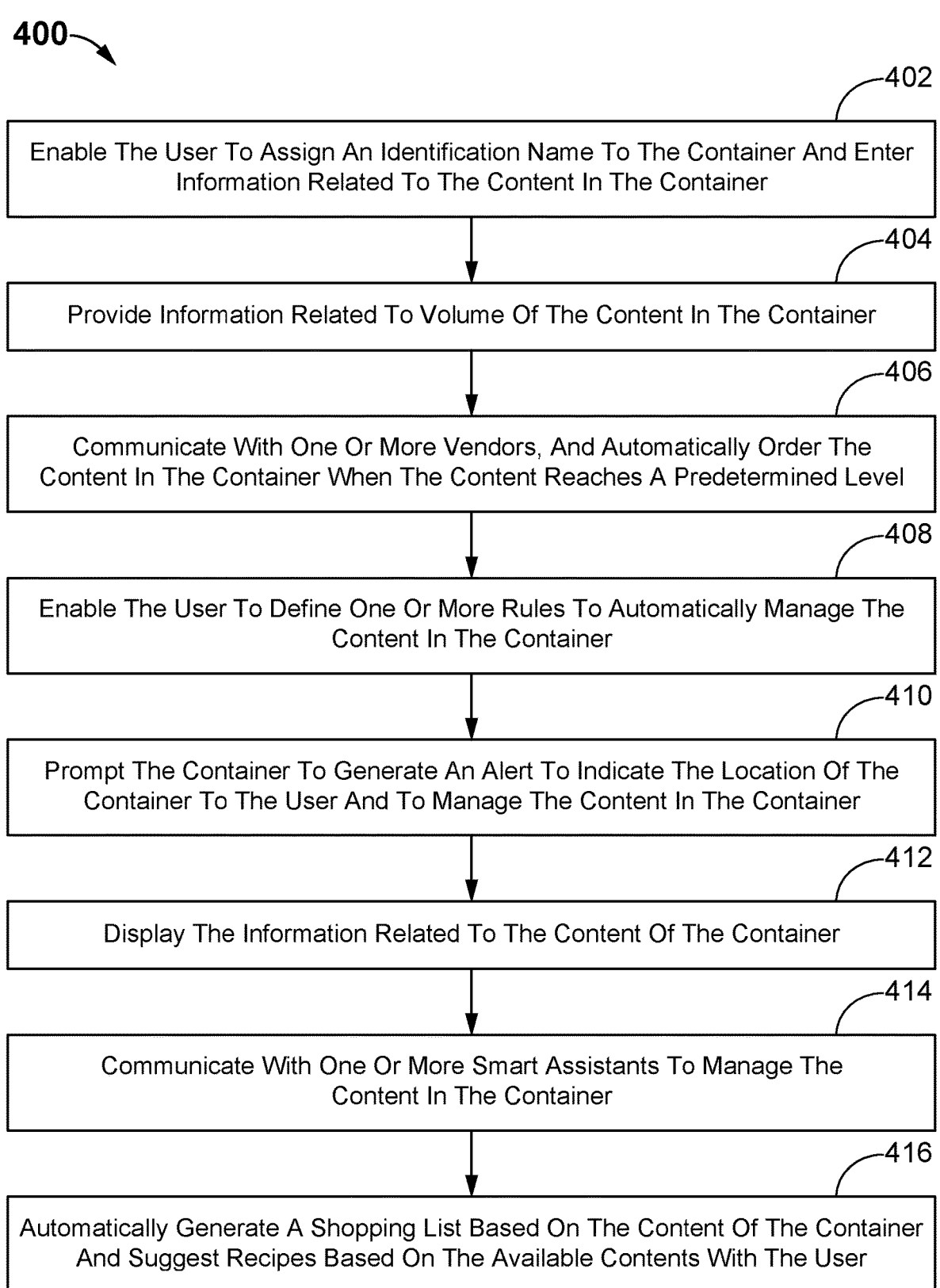

400

402

Enable The User To Assign An Identification Name To The Container And Enter Information Related To The Content In The Container

404

Provide Information Related To Volume Of The Content In The Container

406

Communicate With One Or More Vendors, And Automatically Order The Content In The Container When The Content Reaches A Predetermined Level

408

Enable The User To Define One Or More Rules To Automatically Manage The Content In The Container

410

Prompt The Container To Generate An Alert To Indicate The Location Of The Container To The User And To Manage The Content In The Container

412

Display The Information Related To The Content Of The Container

414

Communicate With One Or More Smart Assistants To Manage The Content In The Container

416

Automatically Generate A Shopping List Based On The Content Of The Container And Suggest Recipes Based On The Available Contents With The User

SYSTEM AND METHOD FOR MANAGING THE CONTENT IN A STORAGE ASSEMBLY

BACKGROUND OF THE INNOVATION

A. Technical Field

The present invention generally relates to management of contents in the storage assembly, and, more particularly, to a system and method for managing content in a storage assembly.

B. Description of Related Art

Generally, a storage assembly, for example, containers are used to store consumable products, for example, foods and beverages, cleaning products, and other consumable and non-consumable products. A typical container used for commercial purpose has a label comprising information, for example, name of the content stored in the container, ingredients of the content, manufacturing date and expiry date. The user periodically performs a visual check to identify the container need to be replenished.

The containers used in households are used for storing foods, for example, sauce, and spices. Unlike the containers used for the commercial purpose, the containers used in household does not have information related to the stored content. The user needs to physically manipulate the containers to check the level of content in the containers.

Further, historical status such as manufacturing date and expiry date cannot be checked in the containers used in the households. The user needs to keep track of the information related to the contents stored in the containers manually. For example, the user needs to note the date and time of storing the contents in a separate notepad. However, this manual process is often laborious, imprecise and prone to error. Further, users, for example, working parents, teenagers, elderly people, people with disability, cannot keep track of contents and the status of the contents in the containers.

Further, in both household and commercial environment, to test the temperature of the content, for example, beverage in the containers, the consumer might touch the outside of the container, drink some of the beverage, pour a small amount of the beverage onto their hand, or dip a finger into the beverage. If the beverage is too hot, such "testing" methods might cause a burn. Also, such testing methods are unsanitary and contaminate the beverage.

Therefore, there is a need for a system and method for managing contents in the storage assembly.

SUMMARY OF THE INNOVATION

The present invention discloses a system and method for managing content in a storage assembly. The system comprises at least one storage assembly having a smart module, a user device associated with a user and a container management server comprising at least one computing device. The storage assembly is a container. The container is adapted for storing at least one content and the smart module comprises at least one sensor configured to measure a volume/weight of content in the container. The smart module further comprises a microcontroller in communication with the sensor to receive information from the sensor, a communication module to facilitate communication with the container management server, a light emitter device configured to emit light, a vibrational device configured to produce local vibration, an audio device, a timer or any combination thereof. The smart module further comprises a display disposed at the container. The display is an electrophoretic display configured to display the information related to the content of the container.

The container management server is in communication with the smart module and the user device. The computing device comprises a memory unit storing a set of modules and a processor configured to execute the modules. The container management server further comprises at least one database for storing information related to the contents of the containers. The information includes, but not limited to, ingredients of the contents, the expiry date and the manufacturing date of the contents, and a maximum weight of the contents, and the history of the contents. The set of modules comprises an input module, a weighing module a marketplace module, an alert module, a customization module, an information display module and a smart assistant module.

The input module is configured to enable the user to assign an identification name to the container and enter information related to the contents of the container. The information includes: ingredients of the content, the expiry date and the manufacturing date of the content, a maximum weight of the content, number of items in the container, weight of the content, or any combination thereof. The weighing module is configured to provide information related to volume of the content in the container. The weighing module is configured to calculate the volume of the content in the container based on the information received from the smart module and the maximum weight of the content in the container. The marketplace module is configured to communicate with one or more vendors, and automatically order the content in the container when the content reaches a predetermined level.

The alert module is configured to prompt the smart module to generate an alert, via at least one of the light emitter device and the vibrational device, to indicate the location of the container to the user. The alert is at least one of an audible alert, a visual alert and a sensory alert or any combination thereof. The customization module is configured to enable the user to pre define one or more rules to automatically order the content from the vendors, and enable the user to define one or more rules to provide alert to the user when the content of the container reaches the predefined level. The customization module is further configured to enable the user to define one or more rules to provide alert to the user when the content of the container is expired.

The customization module is further configured to enable the user to define one or more rules to provide alert to the user and automatically order contents from the vendor when the content of the container reaches the expiry date, when there is change in characteristics of the content, when the content in the container reaches the minimum quantity, when the contents in the container reaches the minimum weight, volume or number, or other characteristics, or any combination thereof. The customization module is further configured to enable the user to define one or more rules to provide alert to the user at least few days before the content of the container reaches the expiry date. The customization module is configured to enable the user to define one or more rules to automatically order the content from the vendors when the content in the container is expired or at a minimum level. The customization module is configured to enable the user to define one or more rules to automatically order the content from the vendors when the content in the container reaches the expiry date.

The information display module is configured to display the information related to the content of the container. In one embodiment, the information related to the content of the container is displayed at the electrophoretic display of the container. The information is displayed in the form an e-paper (e-ink). The smart assistant module is configured to communicate with one or more smart assistants to manage the content in the container. The smart assistant module is further configured to automatically generate a shopping list based on the content of the container. The smart assistant module is further configured to enable the user to edit the generated shopping list based on pre define rules or automatically, and suggest recipes based on the available content with the user.

In one embodiment, the present invention discloses a method for managing content in the storage assembly. The storage assembly is the container or a shelf. The method is incorporated in a system comprising at least one container comprising a smart module, a user device associated with a user and a container management server comprising at least one computing device. The container is adapted for storing at least one content and the smart module comprises at least one sensor configured to measure a volume of content in the container, measure the weight of the content in the container, number of items in the container or any combination thereof. The smart module further comprises a microcontroller in communication with the sensor to receive information from the sensor, a communication module to facilitate communication with the container management server, a light emitter device configured to emit light, a vibrational device configured to produce local vibration, an audio device, a timer, sound device and others/or any combination thereof.

The container management server is in communication with the smart module and the user device. The computing device comprises a memory unit storing a set of modules and a processor configured to executed the modules. The container management server further comprises at least one database for storing information related to the contents of the containers. The information includes, but not limited to, ingredients of the contents, the expiry date and the manufacturing date of the contents, and a maximum/minimum weight of the contents, and the history of the contents. The set of modules comprises an input module, a weighing module a marketplace module, an alert module, a customization module, an information display module and a smart assistant module.

At one step, the input module at the container management server enables the user to assign an identification name to the container and enter information related to the content of the container. The information includes a name of the content, the expiry date, and the manufacturing date. At another step, the weighing module at the container management server provides the information related to volume of the content in the container. At yet another step, the marketplace module at the container management server communicates with one or more vendors, and automatically order the content in the container when the content reaches a predetermined level. At yet another step, the alert module at the container management server prompts the smart module to generate an alert, via at least one of the light emitter device and the vibrational device, to indicate the location of the container to the user.

At yet another step, the customization module at the container management server enables the user to define one or more rules to automatically order the content from the vendors when the content of the container reaches the predetermined level. At yet another step, the customization module at the container management server enables the user to define one or more rules to provide alert to the user when the content of the container reaches the predefined level. In an example, the alert could be an email, a short message service (SMS), application programing interface (API) web hook, queuing message etc. At yet another step, the customization module at the container management server enables the user to define one or more rules to provide alert to the user and automatically order contents from the vendor when the content of the container is expired, change in characteristics of the contents in the container, when content in the container reaches the minimum quantity, when the contents in the container reaches the minimum weight, volume or number, other characteristics or any combination thereof. At yet another step, the customization module at the container management server enables the user to define one or more rules to provide alert to the user when the content of the container reaches the expiry date.

At yet another step, the information display module at the container management server displays the information related to the content of the container. The information related to the content of the container is displayed at the e-paper display of the container. At yet another step, the smart assistant module at the container management server enables the user to communicate with one or more smart assistants to manage the content in the container. At yet another step, the smart assistant module at the container management server generates a shopping list based on the content of the container, automatically. At yet another step, the smart assistant module at the container management server enables the user to edit the generated shopping list. At yet another step, the smart assistant module at the container management server suggests recipes based on the available contents with the user.

Other objects, features and advantages of the present innovation will become apparent from the following detailed description. It should be understood, however, that the detailed description and the specific examples, while indicating specific embodiments of the innovation, are given by way of illustration only, since various changes and modifications within the spirit and scope of the innovation will become apparent to those skilled in the art from this detailed description.

BRIEF DESCRIPTION OF DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

FIG. 4 exemplarily illustrates a flowchart of a method for managing the content in the storage assembly, in an embodiment of the present invention.

DETAILED DESCRIPTION OF EMBODIMENTS

A description of embodiments of the present innovation will now be given with reference to the Figures. It is expected that the present innovation may be embodied in other specific forms without departing from its spirit or essential characteristics. The described embodiments are to be considered in all respects only as illustrative and not restrictive.

Figure 1:
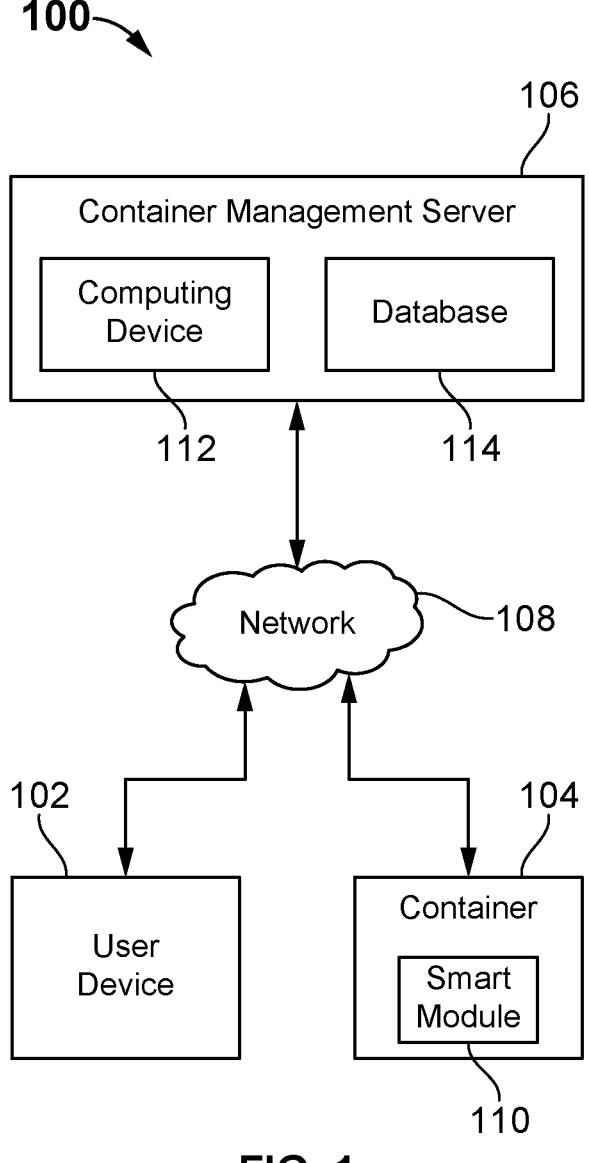
FIG. 1 exemplarily illustrates an environment of a system for managing content in a storage assembly, in an embodiment of the present invention.

FIG. 1 exemplarily illustrates an environment 100 of a system for managing the contents in a storage assembly, according to an embodiment of the present invention. In one embodiment, the storage assembly is a container 104. The system comprises a user device 102 associated with a user, at least one container 104 and a container management server 106. The user device 102 and the container 104 comprising a smart module 110 are in communication with the container management server 106 via a network 108. The smart module 110 is configured to detect the weight of the content and transmits the data related to the weight of the content to the container management server 106. The user device 102 is a computing device configured to provide access to the service provided by the container management server 106. The container management server 106 also referred as server 106 in this document.

The user device 102 further have the capability to provide the user an interface to interact with the services provided by the server 106. The interface, for example, a mobile application that allows the device to wirelessly connect with the server 106 via the network 108. The user device 102 connects with the server 106 via internet/local network. The user device 102 may be, for example, a desktop computer, a laptop computer, a mobile phone, a personal digital assistant, and the like. The user device 102 is configured to execute one or more client applications such as, without limitation, a web browser to access and view content over a computer network, an email client to send and retrieve emails, an instant messaging client for communicating with other users, and a File Transfer Protocol (FTP) client for file transfer. The user device 102 in various embodiments, may include a Wireless Application Protocol (WAP) browser or other wireless or mobile device protocol suites.

The network 108 generally represents one or more interconnected networks, over which the user device 102 and server 106 can communicate with each other. The network 108 may include packet-based wide area networks (such as the Internet), local area networks (LAN), private networks, wireless networks, satellite networks, cellular networks, paging networks, and the like. A person skilled in the art will recognize that the network 108 may also be a combination of more than one type of network. For example, the network 108 may be a combination of a LAN and the Internet. In addition, the network 108 may be implemented as a wired network, or a wireless network or a combination thereof.

In one embodiment, the container management server 106 is at least one of a general or special purpose computer. In an embodiment, it operates as a single computer, which can be a hardware and/or software server, a workstation, a desktop, a laptop, a tablet, a mobile phone, a mainframe, a supercomputer, a server farm, cloud hosting and so forth. In an embodiment, the computer could be touchscreen and/or non-touchscreen device and could run on any type of OS, such as iOS™, Windows™, Android™, Unix™, Linux™ and/or others. In an embodiment, the computer is in communication with network 108. Such communication can be via a software application, a mobile app, a browser, an OS, and/or any combination thereof. The container management server 106 comprises a computing device 112 and at least one database 114.

In an embodiment, the database 114 may be accessible by the container management server 106. In another embodiment, the database 114 may be integrated into the server 106 or separate from it. In an embodiment, at least one database 114 resides in a connected server 106 or in a cloud computing service. In an embodiment, regardless of location, the database 114 comprise a memory to store and organize certain data for use by the server 106. In one embodiment, the database 114 stores information related to the contents in the container 104. The information related to the contents includes identification name of the contents, ingredients of the contents, expiry date and manufacturing date of the contents in the containers 104, history of the contents, and user info.

The computing device 112 is configured through API/messages/others to enable the user to enter information related to the content of the container 104. The computing device 112 further configured to enable the user to assign an identification name to the container 104. The user may assign a name to the container 104. In one embodiment, the information includes ingredients of the content, the expiry date, and the manufacturing date of the content.

The computing device 112 is further configured to provide information related to the volume of the contents in the container 104. The computing device 112 is further configured to communicate with one or more vendors, and automatically order the content in the container 104 when the content reaches a predetermined level. The computing device 112 is configured to calculate the volume of the content in the container 104 based on the information received from the smart module 110 and the maximum weight of the content in the container 104.

The computing device 112 is further configured to prompt the container 104 to generate an alert to indicate the location of the container 104. The computing device 112 is further configured to provide alert to manage the contents in the container 104. The computing device 112 is further configured to display the information related to the contents of the container 104 to the user via the user device 102. The computing device 112 is configured to enable a display 138 (shown in FIG. 5) of the container 104 to display information related to the contents of the container 104. The computing device 112 is configured to enable the user to define one or more rules to automatically order the content from the vendors when the content in the container 104 reaches the predetermined level. The computing device 112 is configured to enable the user to define one or more rules to provide alert to the user when the content of the container 104 reaches the predefined level.

The computing device 112 is configured to enable the user to define one or more rules to provide alert to the user when the content of the container 104 is expired, and enable the user to define one or more rules to provide alert to the user when the content of the container 104 reaches the expiry date. The computing device 112 is further configured to enable the user to define one or more rules to provide alert to the user at least few days before the content of the container 104 reaches the expiry date. The computing device 112 is configured to enable the user to define one or more rules to automatically order the content from the vendors when the content in the container 104 is expired. The computing device 112 is configured to enable the user to define one or more rules to automatically order the content from the vendors when the content in the container 104 reaches the expiry date. The computing device 112 is configured to enable the user to define one or more rules to automatically order the content from the vendors at least few days before the expiry date, or when the content of the container 104 reaches a minimum level.

The computing device 112 is further configured to communicate with one or more smart assistants, for example, Alexa virtual assistant, to order the contents in the container 104. In another embodiment, the computing device 112 is configured to enable the user to communicate with one or more smart assistants to order the content in the container 104. The computing device 112 is configured to communicate with one or more smart assistants to manage the content in the container 104. The computing device 112 is configured to automatically generate a shopping list based on the content of the container and also pre define rules 104. The computing device 112 is configured to enable the user to edit the generated shopping list, and suggest recipes based on the available content with the user.

Figure 2:
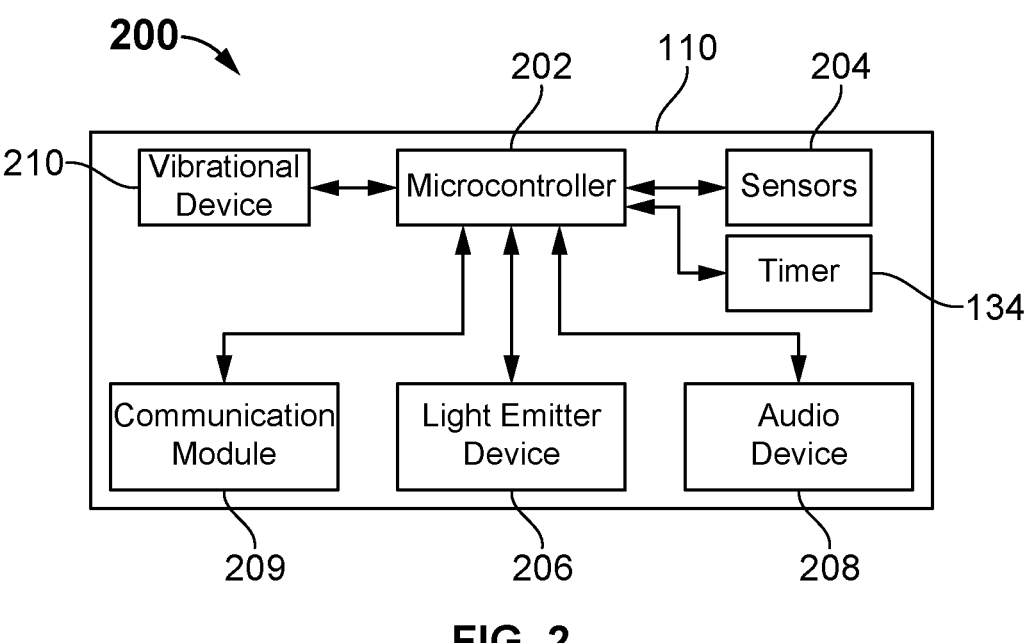
FIG. 2 exemplarily illustrates a block diagram of a smart module, in an embodiment of the present invention.

FIG. 2 exemplarily illustrates a block diagram 200 showing the components of the smart module 110 of the container 104, according to an embodiment of the present invention. The smart module 110 comprises a microcontroller 202, one or more sensors 204, a light emitter device 206 and an audio device 208. The container 104 further comprises a power source to supply power to the smart module 110 The microcontroller 202 is in communication with the sensors 204, the light emitter device 206, the audio device 208. The smart module 110 further comprises a communication module 209 in communication with the microcontroller 202. The sensors 204 are configured to measure the volume of the content in the container 104. The sensors 204 are further configured to measure the presence and absence of contents in the container 104. The sensors 204 are further configured to detect the change in the volume of the contents in the container 104 and transmits the data related to the change of volume of contents to the server 106. In one embodiment, the sensors 204 include an ultrasound sensor, a weight sensor, an infrared sensor, a pressure sensor 132 (shown in FIG. 6) and a laser sensor. The sensor 204 is further configured to operate in a power saving mode. The sensor 204 is adapted to activate on opening the lid of the container 104. In another embodiment, the sensor 204 is adapted to activate on shaking of the container 104.

The audio device 208 is configured to provide notification to the user. In one embodiment, the notification is an audio notification. In another embodiment, the notification is a haptic notification. The light emitter device 206 is configured to provide visual notification to the user. In one embodiment, the light emitter device 206 includes one or more light emitting diodes. The light emitter device 206 is further configured to display the level of contents in the container 104. For example, the yellow color indicates a medium level of contents in the container 104, the red color displays a low level of contents in the container 104 and the green color indicate a full level of contents in the container 104. In another embodiment, the light emitter device 206 is configured to emit light to indicate that the content in the container 104 is expired. In yet another embodiment, the light emitter device 206 is configured to emit light to indicate that the contents in the container 104 are about to reach the expiry date. The smart module 110 further comprises a timer 134 and the power source.

The smart module 110 further comprises the display 138 configured to display the information related to the content of the container 104. The information is displayed in the form an e-paper (e-ink).

Figure 3:
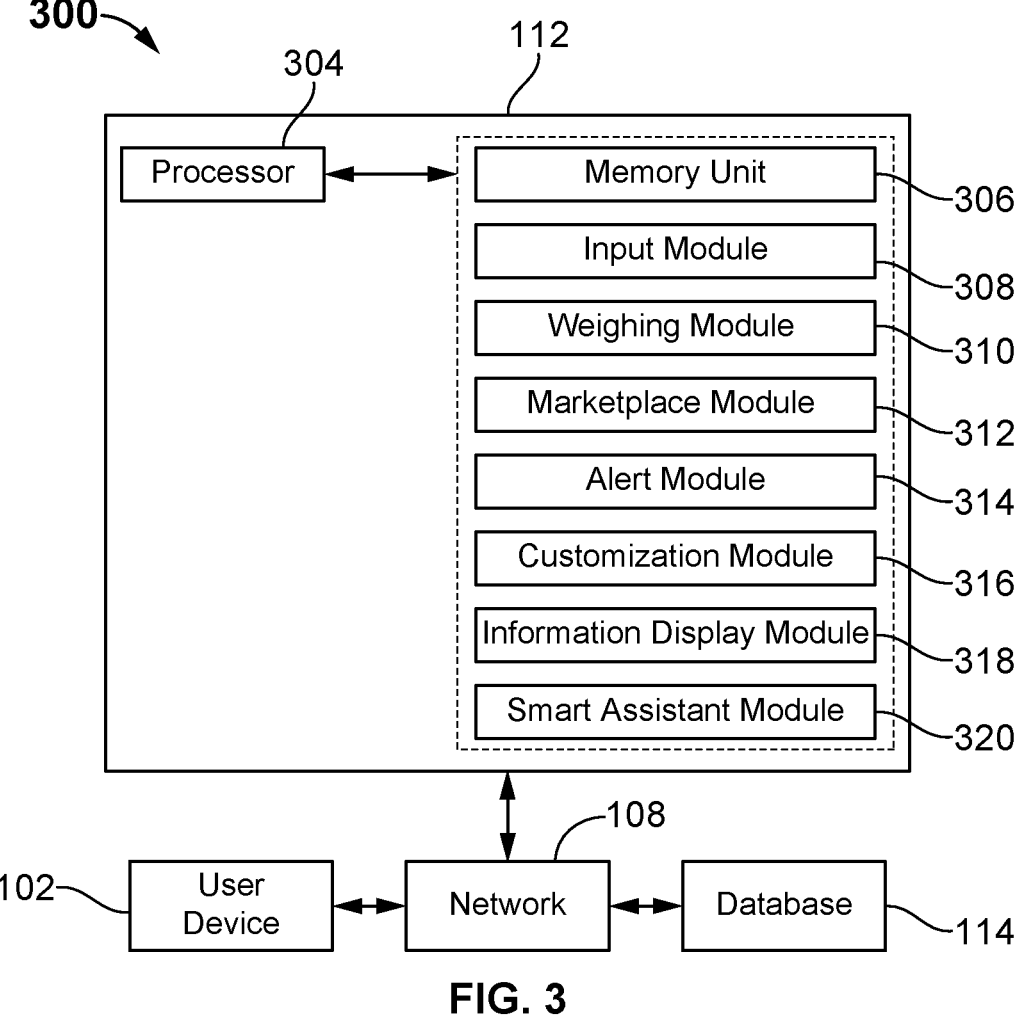
FIG. 3 exemplarily illustrates a block diagram of a container management server, in an embodiment of the present invention.

FIG. 3 exemplarily illustrates a block diagram 300 showing the components and connection between the components of the server 106, according to an embodiment of the present invention. The server 106 comprises the computing device 112 and at least one database 114. The computing device 112 comprises the processor 304 and the memory 306. The memory 306 stores set of program modules executable by the processor 304. The set of modules includes the input module 308, the weighing module 310, the marketplace module 312, the alert module 314, the customization module 316, the information display module 318 and the smart assistance module 320.

The input module 308 is configured to enable the user to set-up an account to manage the contents of the container 104. The user needs to provide user details including, but not limited to, login name and password. After setting up the account, the user needs to switch on the container 104. The system allows the user to connect the user device 102 to the server 106. The input module 308 is configured to enable the user to assign an identification name to the container 104. The input module 308 further enables the user to enter information related to the contents of the container 104. The information of the content includes, but not limited to, ingredients of the content, the expiry date and the manufacturing date of the content, the maximum weight of the content, minimum weight of the content, weight of the content, number of items in the container 104, or any combination thereof. The information related to the contents of the container 104 provided by the user is transferred to the database 114.

The weighing module 310 is configured to provide information related to the volume of the contents in the container 104. The weighing module 310 is configured to calculate the volume of the contents in the container 104 based on the information received from the smart module 110 and the maximum weight of the container 104. The marketplace module 312 is configured to communicate with one or more vendors, and automatically order the content in the container 104 when the content reaches a predetermined level.

The alert module 314 is configured to prompt the container 104 to generate an alert, via at least one of the light emitter device 206 and a vibrational device 210, to indicate the location of the container 104 to the user. In one embodiment, the alert is an audible alert, a visual alert, a sensory alert, or any combination thereof. The alert module 314 is further configured to send alerts to the user device 102 in the form of notification, a call, a message, and an email. Further, the alert could be in email, SMS, API call, IoT message, or others.

The customization module 316 is configured to enable the user to define one or more rules to automatically order the content from the vendors. The customization module 316 is configured to enable the user to define one or more rules to automatically order the content from the vendors when the content in the container 104 is expired. The customization module 316 is configured to enable the user to define one or more rules to automatically order the content from the vendors when the content in the container 104 reaches the expiry date. The customization module 316 is further configured to enable the user to define one or more rules to provide alert to the user when the contents of the container 104 reach the predefined level.

The customization module 316 is further configured to enable the user to define rules to send an alert when the content of the container 104 reaches the expiry date. The customization module 316 is configured to enable the user to define one or more rules to provide alert to the user and automatically order the contents from the vendor when the content of the container 104 is expired, when there is change in characteristics of the content, when the content in the container reaches the minimum quantity, when the contents in the container 104 reaches the minimum weight, volume or number, or other characteristics, or any combination thereof. The customization module 316 is further configured to enable the user to define one or more rules to provide alert to the user at least few days before the content of the container 104 reaches the expiry date.

The information display module 318 is configured to display the information related to the contents of the container 104. In one embodiment, the information display module 318 is configured to display the information related to the contents of the container 104 in the form of an e-paper (e-ink). The information display module 318 is configured to enable the display 138 of the container 104 to display the information related to the content of the container 104. The information is displayed in the form an e-paper (e-ink).

The smart assistant module 320 is configured to communicate with one or more smart assistants to order the content in the container 104. The smart assistant module 320 is configured to communicate with one or more smart assistants to manage the contents in the container 104, for example, the smart assistant module 320 enables the user to check the level of contents in the container 104 and the expiry of the contents in the container 104. The smart assistant module 320 is further configured to enable the user to communicate with one or more smart assistants to order the content in the container 104. The smart assistant module 320 is further configured to automatically generate a shopping list based on the content of the containers 104. The smart assistant module 320 is further configured to enable the user to edit the generated shopping list. The smart assistant module 320 is further configured to suggest recipes based on the available contents with the user. The smart assistant module 320 is further configured to display the calories consumed by the user based on the level of content and the type of content. The smart assistant module 320 is further configured to provide order placement information related to the orders placed by the system. The order information includes, but not limited to, list of items that are delivered, and the items that need to be delivered.

FIG. 4 exemplarily illustrates a flowchart of a method 400 for managing the content in the storage assembly, in an embodiment of the present invention. The storage assembly is the container 104. The method 400 is incorporated in the system comprising at least one container 104 comprising the smart module 110, the user device 102 associated with a user and a container management server 106 comprising at least one computing device 112. The server 106 in communication with the smart module 110 and the user device 102 via the network 108. The container 104 is adapted for storing at least one content and the smart module 110 comprises at least one sensor 204 configured to measure a volume of content in the container 104. The smart module 110 further comprises a microcontroller 202 in communication with the sensor 204 to receive information from the sensor 204, a communication module 209 to facilitate communication with the container management server 106, a light emitter device 206 configured to emit light, a vibrational device 210 configured to produce local vibration, a timer 134 and an audio device 208.

The container management server 106 is in communication with the smart module 110 and the user device 102. The computing device 112 comprises the memory unit 306 storing a set of modules and the processor 304 configured to executed the modules. The container management server 106 further comprises at least one database 114 for storing information related to the contents of the containers 104. The information includes, but not limited to, ingredients of the contents, the expiry date and the manufacturing date of the contents, and a maximum weight of the contents, and the history of the contents. The set of modules comprises an input module 308, a weighing module 310 a marketplace module 312, an alert module 314, a customization module 316, an information display module 318 and a smart assistant module 320.

At step 402, the input module 308 at the container management server 106 enables the user to assign an identification name to the container 104 and enter information related to the content of the container 104. The information includes a name of the content, the expiry date, and the manufacturing date.

At step 404, the weighing module 310 at the container management server 106 provides the information related to volume of the content in the container 104.

At step 406, the marketplace module 312 at the container management server 106 communicates with one or more vendors, and automatically order the content in the container 104 when the content reaches a predetermined level.

At step 408, the customization module 316 at the container management server 106 enables the user to define one or more rules to automatically order the content from the vendors when the content of the container 104 reaches the predetermined level. The customization module 316 at the container management server 106 further enables the user to define one or more rules to provide alert to the user when the content of the container 104 reaches the predefined level. The customization module 316 at the container management server 106 further enables the user to define one or more rules to provide alert to the user when the content of the container 104 is expired. The customization module 316 at the container management server 106 further enables the user to define one or more rules to provide alert to the user when the content of the container 104 reaches the expiry date.

The customization module 316 further enables the user to define one or more rules to automatically order the content from the vendors when the content in the container 104 is expired. The customization module 316 further enables the user to define one or more rules to automatically order the content from the vendors and provide alert to the user when the content in the container 104 reaches the expiry date, when there is change in characteristics of the content, when the content in the container 104 reaches the minimum quantity, when the contents in the container 104 reaches the minimum weight, volume or number, or other characteristics, or any combination thereof. The customization module 316 is further configured to enable the user to define one or more rules to provide alert to the user at least few days before the content of the container 104 reaches the expiry date.

At step 410, the alert module 314 at the container management server 106 prompts the smart module 110 to generate an alert, via at least one of the light emitter device 206 and the vibrational device 210, to indicate the location of the container 104 to the user.

At step 412, the information display module 318 at the container management server 106 displays the information related to the content of the container 104. The information display module 318 is further configured to enable the display 138 of the container 104 to display the information related to the content of the container 104.

At step 414, the smart assistant module 320 at the container management server 106 enables the user to communicate with one or more smart assistants to manage the content in the container 104.

At step 416, the smart assistant module 320 at the container management server 106 generates a shopping list based on the content of the container 104, automatically. The smart assistant module 320 at the container management server 106 further enables the user to edit the generated shopping list. The smart assistant module 320 at the container management server 106 further suggests recipes based on the available contents with the user.

Figure 5:
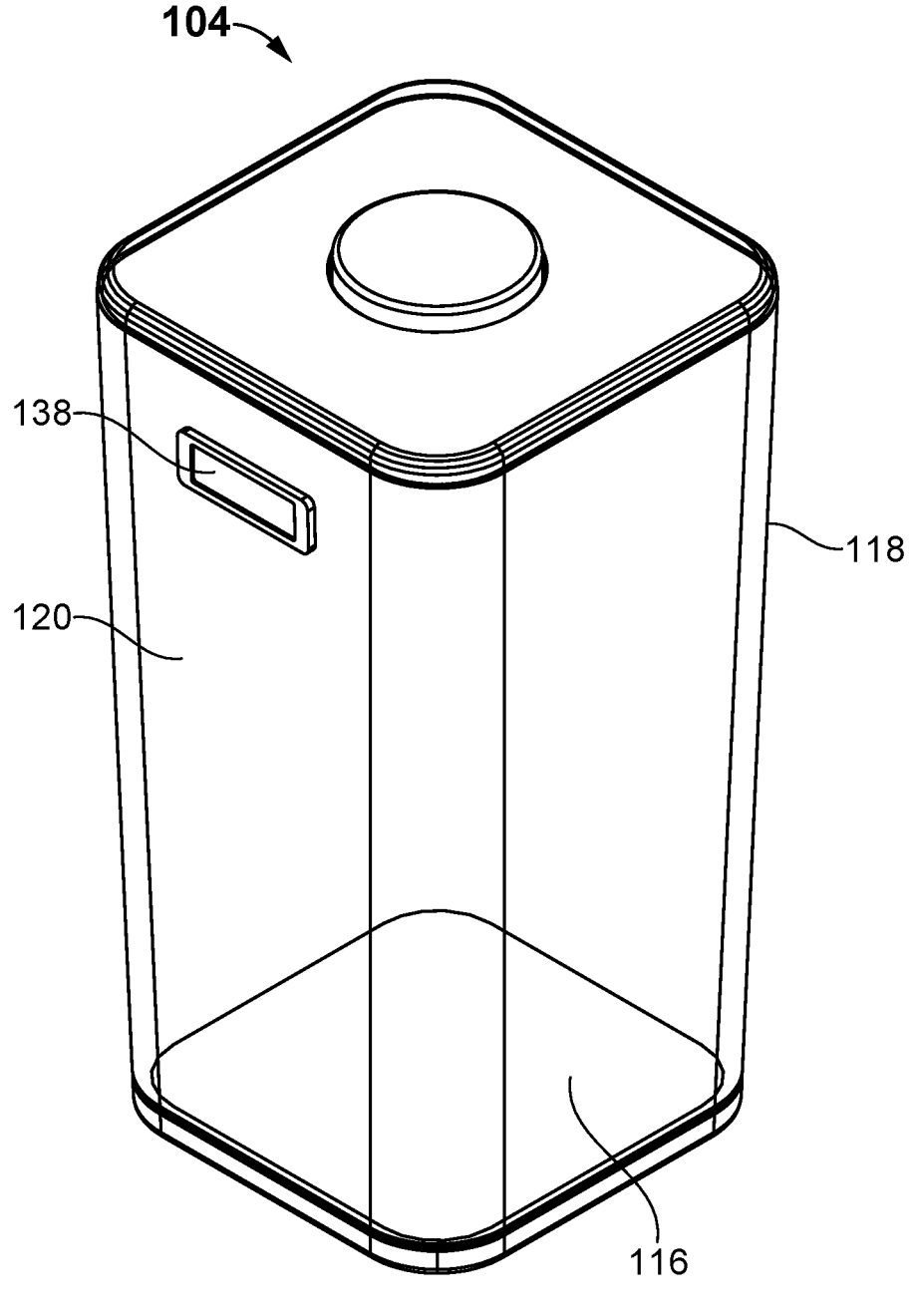
FIG. 5 exemplarily illustrates a perspective view of a container having the smart module, in one embodiment of the present invention.

FIG. 5 exemplarily illustrates a perspective view of a container 104, according to an embodiment of the present invention. The container 104 comprises at least one chamber 120 to store one or more contents. In one embodiment, the container 104 comprises one or more chamber 120 to store one or more contents. The container 104 comprises a base 116 and a plurality of sidewalls 118 extends perpendicular to the base 116 to define the chamber 120 with an opening. The container 104 further comprises a lid 124 to close the opening of the chamber 120. The container 104 comprises the smart module 110. Further, the display 138 is provided on at least one of the walls 118 of the container 104. The display 138 is an e-paper (e-ink) display. The smart module 110 in communication the server 106 is configured to enable the display 138 to display information related to the content of the container 104.

Figure 6:
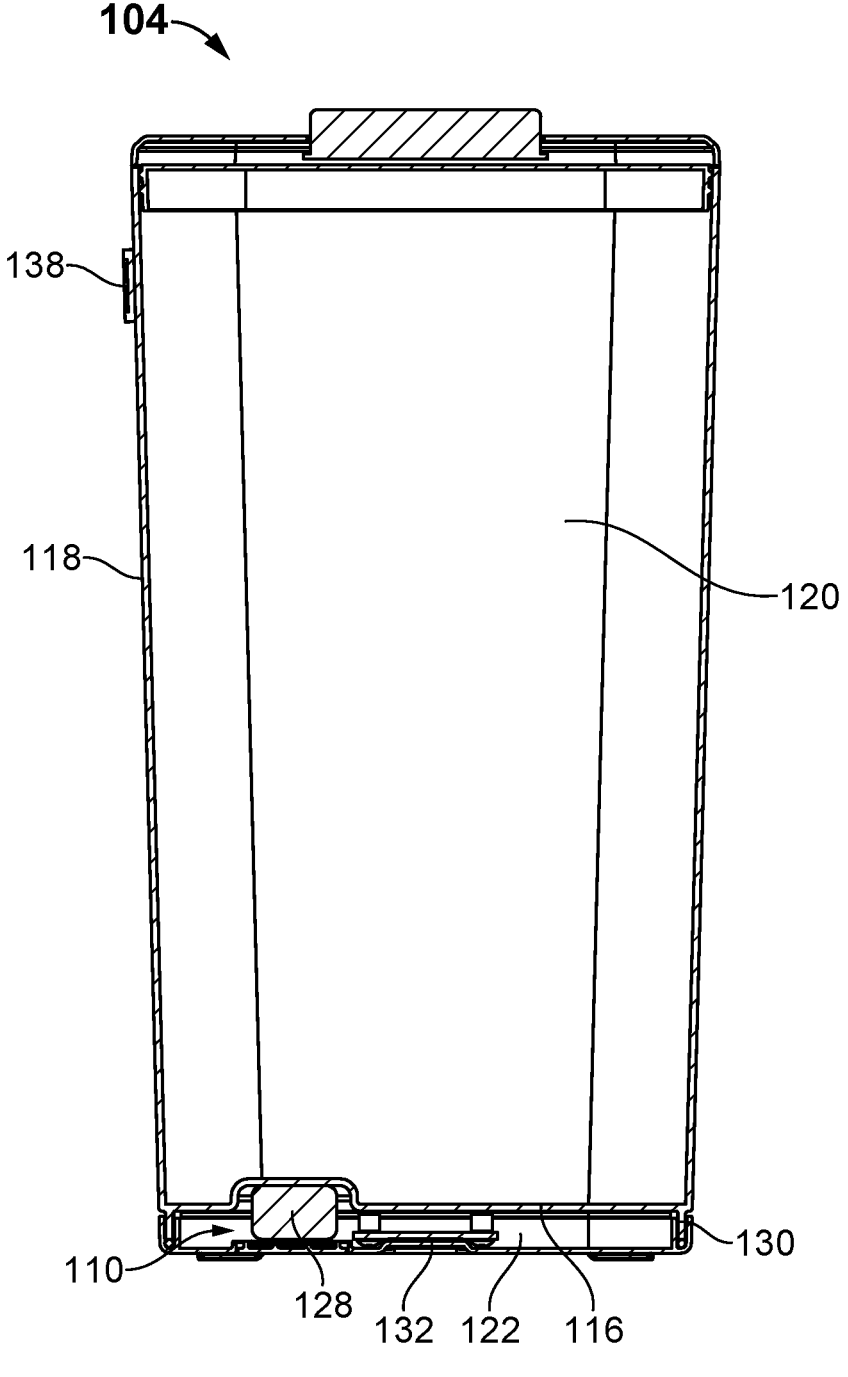
FIG. 6 exemplarily illustrates a sectional view of the container of FIG. 5 having the smart module.
Figure 7:
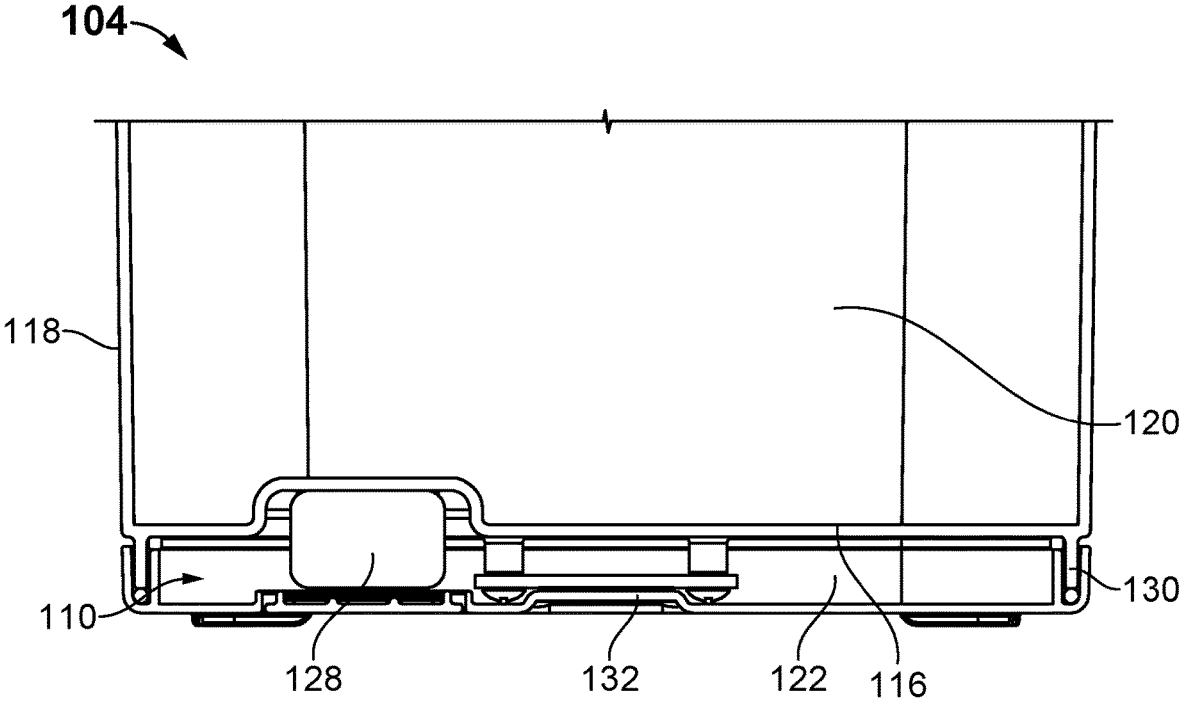
FIG. 7 exemplarily illustrates a sectional view of the container of FIG. 5 showing the components of the smart module.

FIG. 6 exemplarily illustrates a sectional view of the container 104 of FIG. 5 having the smart module 110. FIG. 7 exemplarily illustrates a sectional view of the container 104 of FIG. 5 showing the components of the smart module 110. The container 104 comprises at least one secondary chamber 122 to receive the smart module 110. The secondary chamber 122 is separate from the chamber 120. The secondary chamber 122 is formed at the base 116 of the container 104. In one embodiment, the smart module 110 is disposed at the sidewalls 118 of the container 104. An extension 130 extends from the periphery of the base 116. The extension 130 is adapted to lock with the secondary chamber 122. The extension 130 includes a gasket to form a tight seal. The power source, for example, a rechargeable battery 128 supplies power to the components of the smart module 110. The container 104 is at least one a container from a group including, but not limited, a food container, a bottle for storing liquid such as milk, a medicine container, a tissue box, a vending machine, a public bin, a hygiene bin and a coffee machine. The smart module 110 operates in energy saving mode, when there are no changes in the container 104.

Figure 8:
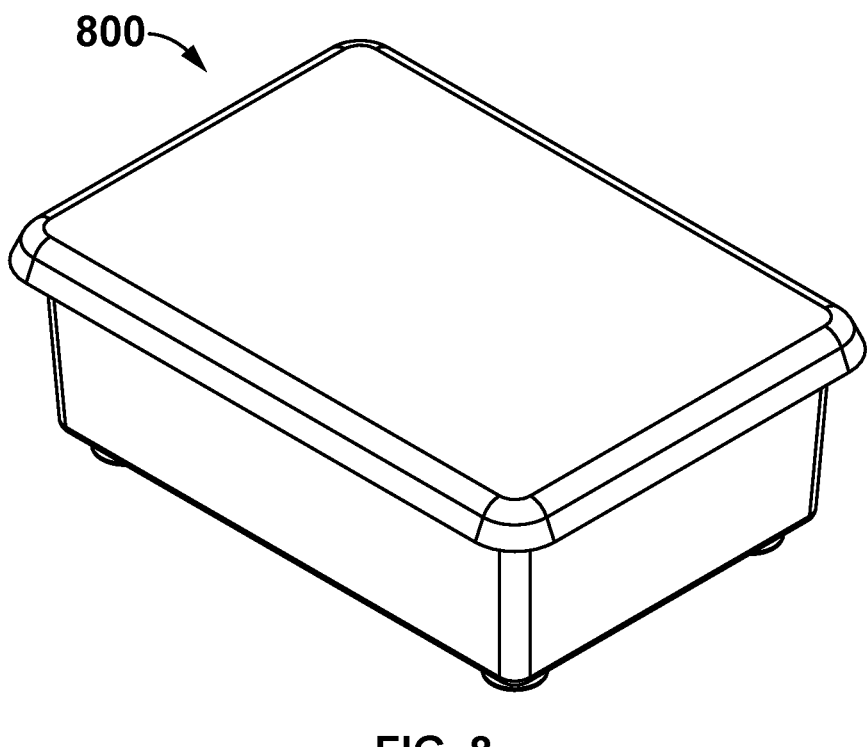
FIG. 8 exemplarily illustrates a perspective view of a container having the smart module, in another embodiment of the present invention.
Figure 9:
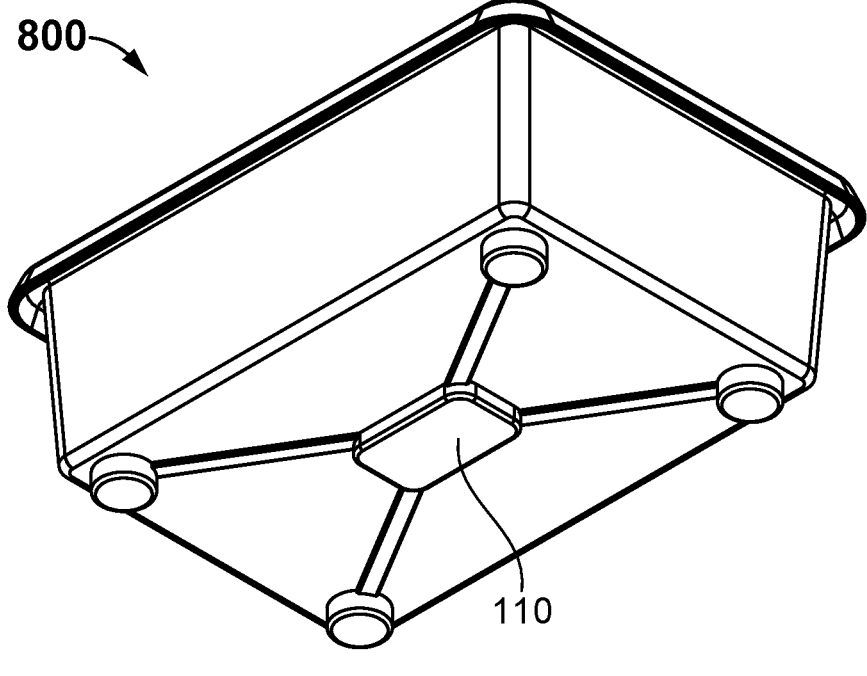
FIG. 9 exemplarily illustrates a bottom perspective view of the container of FIG. 8 having the smart module.

FIG. 8 exemplarily illustrates a perspective view of a container 800 having the smart module 110, in another embodiment of the present invention. The container 800 has a square shaped configuration. FIG. 9 exemplarily illustrates a bottom perspective view of the container 800 of FIG. 8 having the smart module 110 this model can be using in fridge, warehouse and storage cases.

Figure 10:
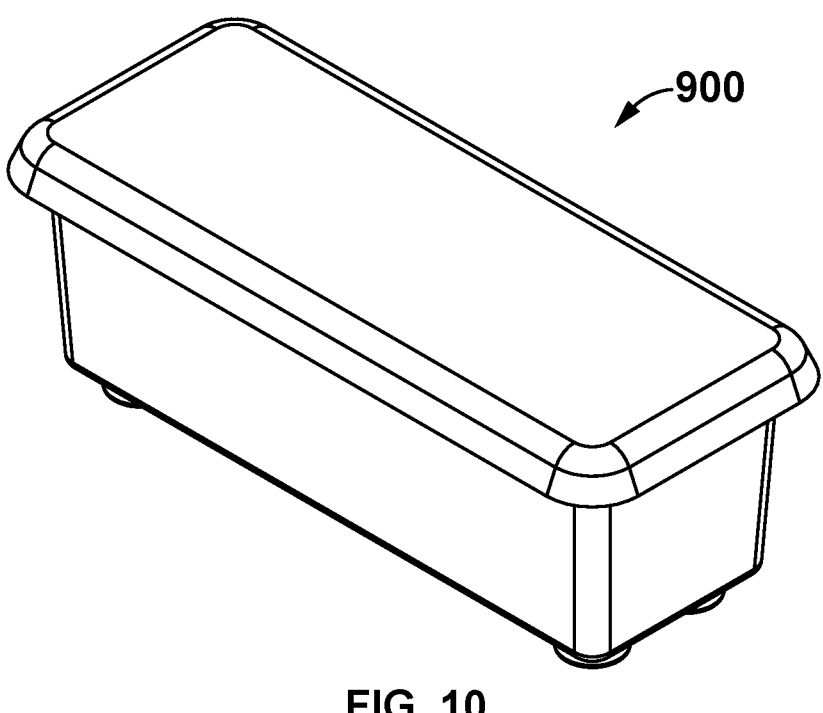
FIG. 10 exemplarily illustrates a perspective view of a container having the smart module, in yet another embodiment of the present invention.
Figure 11:
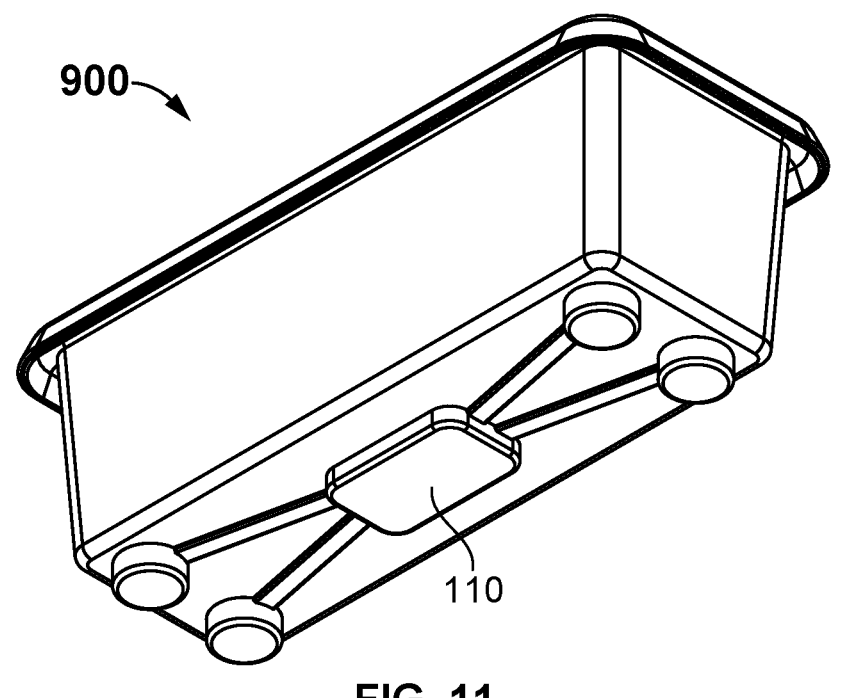
FIG. 11 exemplarily illustrates a bottom perspective view of the container of FIG. 10 having the smart module.

FIG. 10 exemplarily illustrates a perspective view of a container 900 having the smart module 110, in yet another embodiment of the present invention. The container 900 comprises a rectangular shaped configuration. FIG. 11 exemplarily illustrates a bottom perspective view of the container 900 of FIG. 10 having the smart module 110.

Figure 12:
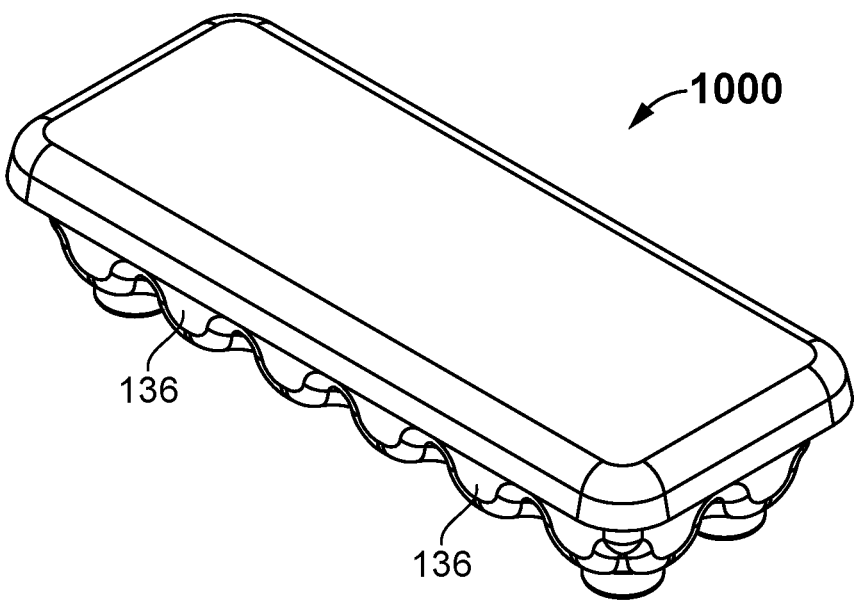
FIG. 12 exemplarily illustrates a perspective view of a container having the smart module, in yet another embodiment of the present invention.
Figure 13:
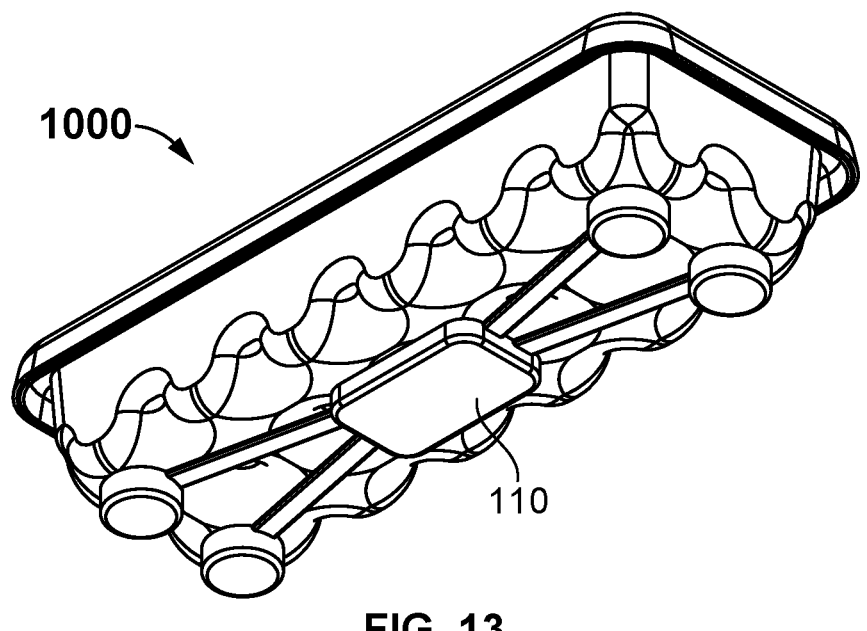
FIG. 13 exemplarily illustrates a bottom perspective view of the container of FIG. 12 having the smart module.

FIG. 12 exemplarily illustrates a perspective view of a container 1000 having the smart module 110, in yet another embodiment of the present invention. FIG. 13 exemplarily illustrates a bottom perspective view of the container 1000 of FIG. 12 having the smart module 110. The container 1000 comprises a number of zones 136.

Figure 14:
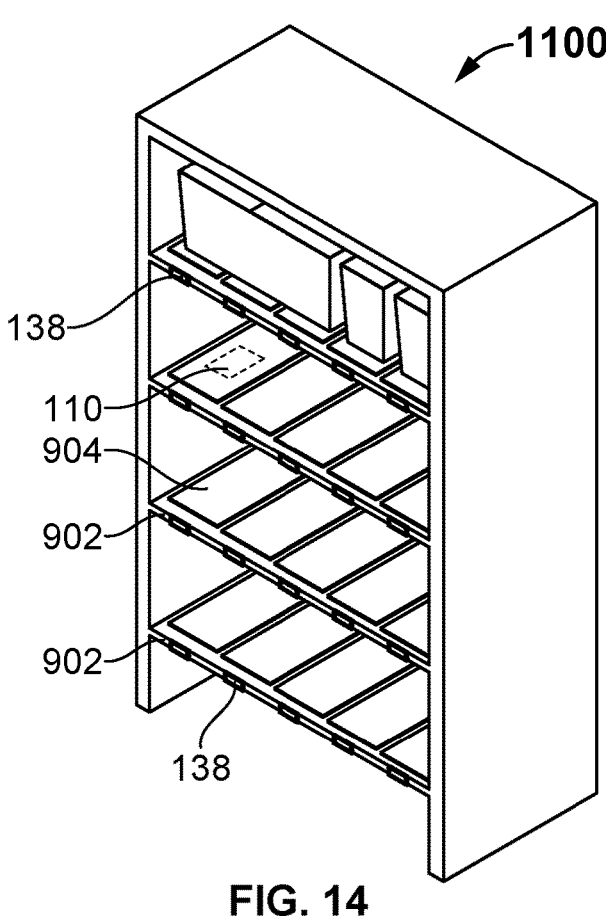
FIG. 14 exemplarily illustrates a perspective view of a rack incorporated with one or more smart modules, in yet another embodiment of the present invention.
Figure 15:
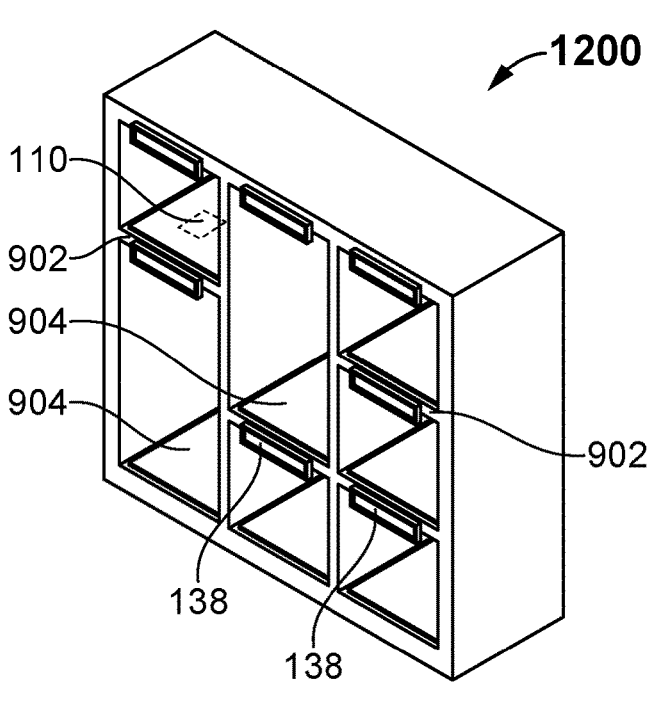
FIG. 15 exemplarily illustrates a perspective view of a rack/shelves incorporated with one or more smart modules, in yet another embodiment of the present invention.

FIG. 14 exemplarily illustrates a perspective view of a rack 1100 incorporated with one or more smart modules 110, in yet another embodiment of the present invention. FIG. 15 exemplarily illustrates a perspective view of a rack 1200 incorporated with one or more smart modules 110, in yet another embodiment of the present invention. Referring to FIG. 14 and FIG. 15, the storage assembly is a rack (1100, 1200) or shelves 902. The rack (1100, 1200) comprises one or more shelves 902. The shelves 902 are divided into a plurality of blocks or zones 904. At least one smart module 110 is disposed at each block 904 of the shelves 902. The smart modules 110 of the plurality of zones 904 are configured to operate individually. In another embodiment, the smart modules 110 of the plurality of zones 904 are configured to operate as unit.

In yet another embodiment, at least one sensor 204 is disposed at each zone 904 of the shelves 902 and at least one smart module 110 is disposed at the shelves 902. The smart module 110 is configured to receive information form the sensor 204 from each zone 904. The smart module 110 communicates the information to the server 106 in real time. Further, at least one display 138 at each zone are controlled by the server 106. The server 106 further configured to enable the user to control the display 138 via the user device 102. The server 106 is configured to automatically place orders for refilling the shelves 902. The server 106 is further configured to automate stock collection. The sever 106 is further configured to notify the user, for example, a supplier, when the contents in the zones 904 reaches a predefined level, or expiry date. The server 106 is further configured to report information related to sold contents or items at the zones 904 and the shelves 902 to the user. The server 106 is further configured to report information related to contents or items in stock at the zones 904 and the shelves 902 to the user. The server 106 is further configured to report information related to the items that are sold and actual stock of the items to the user.

In one embodiment, each shelf 902 of the plurality of shelves 902 comprises at least one smart module 110, and each shelf 902 is configured to operate individually. In another embodiment, the plurality of shelves 902 comprises at least one smart module 110 and the plurality of shelves 902 are configured to operate as a single unit. In yet another embodiment, each zone 904 comprises at least one smart module 110, and each zone 904 is configured to operate individually. In yet another embodiment, the plurality of zones 904 are configured to linked and operates as a single unit.

The server 106 is configured to provide an application programming interface to integrate with one or more external systems including Siri, Google and Alexa. Further, the API enable the user to list their product and services.

The smart modules 110 could be used in any storage facility and storage assembly where storage and management of items or content is required. The storage facility, includes, but not limited to, manufacturing facility, domestic storage, home storage facility, fridge shelf, restaurant, retail industry, warehouse and cupboard shelf.

Advantageously, according to the present invention, the shelves in the warehouse, bars, fridge and retailer could utilize the system of the present invention to manage inventory. Further the system enables to automatically manage the inventory, for example, restocking the inventory. The system further enables the user to monitor the content level in the container and manage the contents in the container. The system is further configured to automatically order the contents of the container. The system is further configured to provide alerts regarding the contents in the container. The system is further configured to provide alert to indicate the position of the container. The system is further configured to create shopping list and suggest cooking recipes/menu/specials based on the available contents and the level of the contents in the container. The system of the present invention could be applied in manufacturing facility, domestic storage, fridge shelf, restaurants, retail industries, warehouses and cupboard shelf.

Preferred embodiments of this innovation are described herein, including the best mode known to the innovators for carrying out the innovation. It should be understood that the illustrated embodiments are exemplary only and should not be taken as limiting the scope of the innovation.

The foregoing description comprises illustrative embodiments of the present innovation. Having thus described exemplary embodiments of the present innovation, it should be noted by those skilled in the art that the within disclosures are exemplary only, and that various other alternatives, adaptations, and modifications may be made within the scope of the present innovation. Merely listing or numbering the steps of a method in a certain order does not constitute any limitation on the order of the steps of that method. Many modifications and other embodiments of the innovation will come to mind to one skilled in the art to which this innovation pertains having the benefit of the teachings in the foregoing descriptions. Although specific terms may be employed herein, they are used only in generic and descriptive sense and not for purposes of limitation. Accordingly, the present innovation is not limited to the specific embodiments illustrated herein.

What is claimed is:

1. A system for managing content in a storage assembly, comprising:

at least one storage assembly having a smart module, the storage assembly includes at least one container, the container is adapted for storing at least one content, the smart module comprising:

at least one sensor configured to measure a weight or quantity of content in the container, an optional display disposed on the container configured to display information related to the contents in the container, a microcontroller in communication with the sensor, a communication module configured to enable communication with a container management server, a light emitter device configured to emit light, a vibrational device configured to produce local vibration, an audio device, and a timer;

a user device associated with a user;

wherein the container management server comprising at least one computing device, wherein the container management server is in communication with the smart module and the user device, the computing device comprises a memory unit storing a set of modules and a processor configured to execute the modules, the set of modules comprising:

an input module configured to enable the user to assign an identification name to the container and enter information related to the contents of the container, wherein the information includes ingredients of the content, an expiry date and a manufacturing date of the content, and a maximum weight of the content;

a weighing module configured to calculate the volume or quantity of the content in the container based on the information received from the smart module and the maximum weight of the content in the container, and a marketplace module configured to communicate with one or more vendors, and automatically order the content in the container when the content reaches a predetermined level, an alert module configured to prompt the smart module to generate an alert, via at least one of the light emitter device, the vibrational device, or the audio device, to indicate the location of the container to the user, wherein the alert is at least one of an audible alert, a visual alert, and a sensory alert, and a customization module configured to enable the user to define one or more rules to automatically order content and/or generate alerts based on at least one of the following:

when the content in the container reaches a predefined level, when the content is expired, or when the content is a few days away from expiry.

2. The system of claim 1, wherein the container management server further comprises at least one database for storing information related to the contents of the containers, wherein the information includes ingredients of the contents, the expiry date and the manufacturing date of the contents, a maximum weight of the contents, a minimum weight of the content, number of items in the container and the history of the contents.

3. The system of claim 1, wherein the weighing module is configured to calculate the volume of the content in the container based on the information received from the smart module and the maximum weight of the content in the container.

4. The system of claim 1, wherein the microcontroller in communication with the sensor to receive information from the sensor, wherein the communication module to facilitate communication with the container management server, the light emitter device configured to emit light, the vibrational device configured to produce local vibration, the audio device and the timer.

5. The system of claim 1, further comprises an information display module configured to enable the display to display the information related to the content of the container in the form e-paper (e-ink).

6. The system of claim 1, further comprises a smart assistant module configured to communicate with one or more smart assistants to manage the content in the container.

7. The system of claim 6, wherein the smart assistant module is configured to automatically generate a shopping list based on the content of the container.

8. The system of claim 6, wherein the smart assistant module is configured to enable the user to edit the generated shopping list, and suggest recipes based on the available content with the user.

9. A method for managing content in a storage assembly, comprising the step of:

providing at least one storage assembly having a smart module, the storage assembly is at least one of a container and a shelf, the container is adapted for storing at least one content, the smart module comprises at least one sensor configured to measure a weight or quantity of content in the container and at least one display disposed on the container configured to display information related to the contents in the container, the display being an electrophoretic (e-paper) display, a microcontroller in communication with the sensor, and a light emitter device, a vibrational device, an audio device, and a timer;

wherein a user device associated with the user, and a container management server comprising at least one computing device, wherein the container management server is in communication with the smart module of the container and the user device, the computing device comprises a memory unit storing a set of modules and a processor configured to executed the modules;

enabling, via an input module at the container management server, the user to assign an identification name to the container and enter information related to the content of the container, wherein the information includes a name of the content, the expiry date, and the manufacturing date;

providing, via a weighing module at the container management server, the information related to volume of the content in the container, based on data received from the smart module and the maximum weight of the content in the container; and communicating, via a marketplace module at the container management server, with one or more vendors, to automatically order the content in the container when the content reaches a predetermined level;

prompting, via an alert module, the smart module to generate an alert via the light emitter, vibrational device, or audio device to indicate the location of the container or the status of the contents;

enabling, via a customization module, the user to define one or more rules to trigger alerts and automatic orders based on content expiration, threshold depletion, or proximity to expiry.

10. The method of claim 9, further comprising the step of: displaying, via an information display module in the user device app which is connected to the container management server, the information related to the content of the container and history, and enabling, via the information display module at the container management server, to display information related to the contents in the container at the display of the container in the form of e-paper.

11. The method of claim 9, further comprising the step of: enabling, via a smart assistant module at the container management server, the user to communicate with one or more smart assistants to manage the content in the container.

12. The method of claim 11, further comprising the step of: generating, via the smart assistant module at the container management server, a shopping list based on the content of the container, automatically or based on pre define rules.

13. The method of claim 11, further comprising the step of: enabling, via the smart assistant module at the container management server, the user to edit the generated shopping list.

14. The method of claim 11, further comprising the step of: suggesting, via the smart assistant module at the container management server, recipes based on the available contents with the user.

* * * * *